(12) United States Patent
Takahashi et al.

(10) Patent No.: US 10,587,004 B2
(45) Date of Patent: Mar. 10, 2020

(54) NONAQUEOUS ELECTROLYTE BATTERY

(71) Applicant: Panasonic Intellectual Property Management Co., Ltd., Osaka (JP)

(72) Inventors: Tadayoshi Takahashi, Osaka (JP); Tomohiro Yagishita, Osaka (JP); Toshie Wata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 7 days.

(21) Appl. No.: 15/768,009

(22) PCT Filed: Oct. 21, 2016

(86) PCT No.: PCT/JP2016/004650
§ 371 (c)(1),
(2) Date: Apr. 13, 2018

(87) PCT Pub. No.: WO2017/085900
PCT Pub. Date: May 26, 2017

(65) Prior Publication Data
US 2018/0358650 A1 Dec. 13, 2018

(30) Foreign Application Priority Data

Nov. 18, 2015 (JP) .................................. 2015-225510

(51) Int. Cl.
*H01M 10/0525* (2010.01)
*H01M 10/0569* (2010.01)
(Continued)

(52) U.S. Cl.
CPC ....... *H01M 10/0525* (2013.01); *H01M 4/134* (2013.01); *H01M 4/386* (2013.01);
(Continued)

(58) Field of Classification Search
CPC .......... H01M 4/13; H01M 4/134; H01M 4/38; H01M 4/386; H01M 4/36; H01M 4/48;
(Continued)

(56) References Cited

U.S. PATENT DOCUMENTS

2015/0017540 A1  1/2015  Wata et al.
2016/0226100 A1*  8/2016  Yamada ................ H01M 4/587

FOREIGN PATENT DOCUMENTS

WO    2013/140791    9/2013

OTHER PUBLICATIONS

International Search Report of PCT application No. PCT/JP2016/004650 dated Jan. 24, 2017.

* cited by examiner

*Primary Examiner* — Brittany L Raymond
(74) *Attorney, Agent, or Firm* — McDermott Will & Emery LLP

(57) ABSTRACT

A nonaqueous electrolyte battery includes a positive electrode, a negative electrode, a separator interposed between the positive electrode and negative electrode, and a nonaqueous electrolyte. The positive electrode includes vanadium pentoxide, a first carbon black, and a first binder. The negative electrode includes a silicon-containing material, graphite, a second carbon black, and a second binder. When the battery voltage is 0 V, the potential of each of the positive electrode and negative electrode is 2.5 to 3.5 V versus metal lithium.

6 Claims, 1 Drawing Sheet

(51) Int. Cl.
*H01M 10/0568* (2010.01)
*H01M 4/48* (2010.01)
*H01M 4/38* (2006.01)
*H01M 4/62* (2006.01)
*H01M 4/134* (2010.01)

(52) U.S. Cl.
CPC ............ *H01M 4/483* (2013.01); *H01M 4/625* (2013.01); *H01M 10/0568* (2013.01); *H01M 10/0569* (2013.01); *H01M 2300/004* (2013.01); *Y02E 60/122* (2013.01)

(58) Field of Classification Search
CPC ........ H01M 4/483; H01M 4/62; H01M 4/621; H01M 4/625; H01M 10/052; H01M 10/0525; H01M 10/0568; H01M 10/0569; H01M 2300/0025; Y02E 60/122
See application file for complete search history.

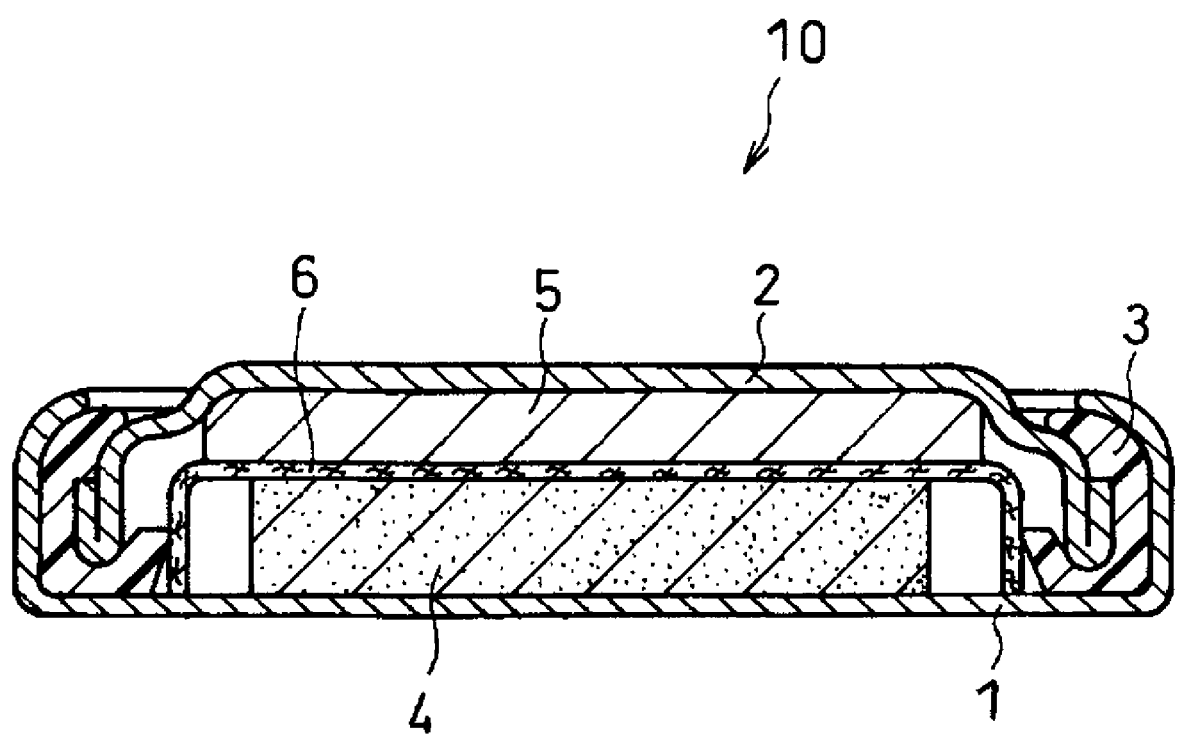

US 10,587,004 B2

NONAQUEOUS ELECTROLYTE BATTERY

PRIORITY

This application is a U.S. National stage application of International Application PCT/JP2016/004650, with an international filing date of Oct. 21, 2016, which claims priority to Japanese Patent Application No. 2015-225510 filed on Nov. 18, 2015. The entire disclosures of International Application PCT/JP2016/004650 and Japanese Patent Application No. 2015-225510 are hereby incorporated herein by reference.

TECHNICAL FIELD

The present invention relates to a nonaqueous electrolyte battery using a positive electrode containing vanadium pentoxide, and a negative electrode containing a silicon-containing material.

BACKGROUND ART

Nonaqueous electrolyte batteries are widely used as main power sources of various electronic apparatuses and memory backup power sources. Recently, the downsizing, the enhancement of functionality, and the increase in memory capacity of mobile devices—such as mobilephones, digital still cameras, wireless communication devices, and watches—have progressed. Following this progress, small-sized, high-capacity, and high-output nonaqueous electrolyte batteries are demanded.

As the positive electrode active material of a nonaqueous electrolyte battery, manganese dioxide, graphite fluoride, vanadium pentoxide, lithium cobalt oxide, or lithium manganese oxide is in practical use. Among them, vanadium pentoxide ($V_2O_5$) has a potential of 3.0 to 4.0 V versus that of metal lithium, and a high capacity. While, a silicon-containing material used as the negative electrode active material, has a high capacity.

Thus, Patent Literature 1 discloses a lithium battery that includes vanadium pentoxide as the positive electrode active material, and silicon as the negative electrode active material. This document propose that the balance of nonaqueous electrolyte included in the positive electrode and the negative electrode is controlled so as to exhibit a desired performance from the initial state.

CITATION LIST

Patent Literature

PTL 1: International Patent Publication No. 2013/140791

SUMMARY OF THE INVENTION

A mobile device may be left with consuming electric power for a long time. In this case, the nonaqueous electrolyte battery equipped with the mobile device has fully discharged, and keep left in that state. When the nonaqueous electrolyte battery has fully discharged, generally, occurrence of structural degradation in the positive electrode active material and the negative electrode active material results in progress of a side reaction accompanied by the decomposition of the nonaqueous electrolyte. Therefore, a nonaqueous electrolyte battery that can keep a desired performance with a low degradation level even after storage in the full discharge state is demanded.

In consideration of the above-mentioned problems, an aspect of the present disclosure relates to a nonaqueous electrolyte battery including a positive electrode, a negative electrode, a separator interposed between the positive electrode and negative electrode, and a nonaqueous electrolyte. The positive electrode includes vanadium pentoxide, a first carbon black, and a first binder. The negative electrode includes a silicon-containing material, graphite, a second carbon black, and a second binder. When the battery voltage is 0 V, the potential of each of the positive electrode and negative electrode is 2.5 to 3.5 V versus that of metal lithium.

In the above-mentioned aspect of the present disclosure, a good practical nonaqueous electrolyte battery having a low degradation level after keeping left in the full discharge state is obtained.

BRIEF DESCRIPTION OF DRAWINGS

FIG. 1 is a cross-sectional schematic view showing a coin-type lithium secondary battery in accordance with an exemplary embodiment of the present invention.

DESCRIPTION OF EMBODIMENT(S)

A nonaqueous electrolyte battery of the present disclosure includes a positive electrode, a negative electrode, a separator interposed between the positive electrode and negative electrode, and a nonaqueous electrolyte. The positive electrode includes vanadium pentoxide, a first carbon black, and a first binder. The negative electrode includes a silicon-containing material, graphite, a second carbon black, and a second binder. The positive electrode and negative electrode are designed so that, in case of the battery voltage at 0V, the potential of each of them is 2.5 to 3.5 V versus that of metal lithium, preferably 2.7 to 3.3 V more preferably 2.8 to 3.2 V.

Vanadium pentoxide ($V_2O_5$) having a three-dimensional channel which are capable of insertion and extraction of lithium ions serves as a high capacity positive electrode active material. Though vanadium pentoxide is generally crystalline or amorphous, crystalline vanadium pentoxide is desirable because it is hardly dissolved in a nonaqueous electrolyte and the increase in irreversible capacity is easily suppressed.

In a lithium-ion battery of a typical nonaqueous electrolyte battery, a positive electrode regulation method in which the negative electrode capacity is higher than the positive electrode capacity, is employed from the view of suppressing lithium deposition in the negative electrode. However, it is difficult to suppress the decrease in positive electrode potential in the full discharge state in this method. When the potential versus metal lithium is lower than 2.5 V, the structural degradation of vanadium pentoxide becomes significant and the capacity reduction progresses. While, when the positive electrode capacity is sufficiently higher than the negative electrode capacity, the decrease in the positive electrode potential in the full discharge state is suppressed, and the positive electrode potential versus metal lithium can be kept at 2.5 V or more, preferably 2.7 V or more, more preferably 2.8 V or more. Thus, a good practical battery with lowering the structural degradation of vanadium pentoxide can be produced.

The silicon-containing material included in the negative electrode is not significantly degraded even when the negative electrode potential is 2.5 to 3.5 V. In a typical lithium-ion battery, the upper-limit potential of the negative electrode versus metal lithium is normally designed to be 2.0 to 2.5 V. Therefore, the stability of the silicon-containing material at a high potential exceeding 2.5 V is unknown. At this point, according to new findings, a good practical negative electrode with lowering the degradation level of the silicon-containing material can be produced in case of the upper-limit potential of the negative electrode at 3.5 V.

Hereinafter, the configuration of the nonaqueous electrolyte battery of the present disclosure is described in more detail.

(Positive Electrode)

The positive electrode includes a positive electrode active material, a first carbon black, and a first binder as essential components. The positive electrode active material includes vanadium pentoxide. The positive electrode is produced using a mixture (positive electrode mixture) containing the essential components. A positive electrode of a coin-shaped or button-shaped battery can be obtained by compression-molding the positive electrode mixture into a pellet shape, for example. Furthermore, a belt-like positive electrode used for a winding-type battery or the like can be obtained by mixing the positive electrode mixture and a liquid dispersion medium to prepare slurry, applying the slurry to a positive electrode current collector to form a coated film, and drying and compressing the coated film.

When vanadium pentoxide is employed as the positive electrode active material, the positive electrode has a high potential of about 3.5 V versus metal lithium and a high flatness of the plateau. Therefore, a high capacity battery is easily obtained. Vanadium pentoxide has a low self-discharge, and hence is appropriate for not only a power source for a mobile device but also a backup power source.

The positive electrode active material may also include a component known as a positive electrode active material of the nonaqueous electrolyte battery. However, the percentage of vanadium pentoxide in the positive electrode active material is preferably 70 mass % or more, more preferably 80 mass % or more. Vanadium pentoxide may occupy 100% of the positive electrode active material. Examples of the known component include: sulfide such as $TiS_2$ or $MoS_2$; metal oxide such as $V_6O_{13}$ or $MnO_2$; and a lithium-containing transition metal oxide such as lithium cobalt oxide, lithium nickel oxide, or lithium manganese oxide.

The vanadium pentoxide may be amorphous, but is preferably crystalline (orthorhombic) because a crystalline vanadium pentoxide is hardly dissolved even at a high voltage and the capacity degradation due to structural degradation is low. The vanadium pentoxide can be determined to be crystalline by measuring an X-ray diffraction image. When the vanadium pentoxide is orthorhombic, a peak attributed to the (001) plane is observed near $2\theta=20°$, and a peak attributed to the (110) plane is observed near $2\theta=25°$.

Vanadium pentoxide is normally in a particle state, and the average particle diameter is preferably 1 to 30 µm, more preferably 3 to 20 µm, further preferably 5 to 15 µm. Here, the average particle diameter is determined on the basis of a specific surface area calculated by an air permeability method.

The positive electrode includes a first carbon black as a first conductive agent. Thereby, when the battery voltage arrives at around 0V, the positive electrode allows to be easily stabilized. Therefore, excessive reduction in the positive electrode potential is suppressed. The stabilization of the positive electrode potential is caused by interaction of the first carbon black with the anions or cations (lithium ions) of the solute contained in the nonaqueous electrolyte. The interaction is considered as follows: when the positive electrode potential is 3 V or more versus metal lithium, the anions are adsorbed by the carbon black; and, when the positive electrode potential is less than 3 V, the lithium ions are adsorbed by the carbon black.

Examples of the first carbon black include acetylene black, Ketjen black, channel black, furnace black, lamp black, and thermal black. Among them, Ketjen black is especially preferable. The average particle diameter of the first carbon black is not particularly limited, for example is within a range of 10 to 300 nm.

The amount of the first carbon black included in the positive electrode is preferably 2 to 10 pts·mass, more preferably 3 to 9 pts·mass, for 100 pts·mass of vanadium pentoxide. When the amount is within such a range, the positive electrode capacity can be kept high, and an effect of stabilizing the positive electrode potential by the carbon black is sufficiently exhibited. This range is also effective in keeping a high conductivity of the positive electrode and suppressing the increase of initial internal resistance.

The first conductive agent may include a material other than carbon black. As the first conductive agent other than carbon black, graphite such as natural graphite or artificial graphite, or carbon fiber is employed.

The positive electrode further may include aluminum powder. When the aluminum powder included in the positive electrode, the dissolution into the nonaqueous electrolyte by oxidation of vanadium pentoxide at overcharge will be suppressed. When the oxide of the vanadium pentoxide is dissolved, a film formed on the surface of the negative electrode may results in disturbing a charge/discharge reaction. It is estimated that the aluminum powder is oxidized earlier than the vanadium pentoxide at overcharge. Also, using the aluminum powder improves the strength of the positive electrode.

Preferably, the aluminum powder includes particles having a particle diameter of 45 µm or less by 60 mass % or more. Thus, the aluminum powder is easily inclined to be oxidized at overcharge. The particle size distribution of the aluminum powder can be measured by a Ro-tap method. The amount of the aluminum powder contained in the positive electrode is preferably 1 to 20 pts·mass, more preferably 1 to 10 pts·mass, for 100 pts·mass of positive electrode active material.

Examples of the first binder included in the positive electrode contain polyolefin such as polyethylene or polypropylene; fluorine resin such as polytetrafluoroethylene, polyvinylidene fluoride, tetrafluoroethylene-hexafluoropropylene copolymer, or its modified body; rubbery polymer such as styrene-butadiene rubber or modified acrylonitrile rubber; and acrylic polymer such as polyacrylic acid, acrylic acid-methacrylic acid copolymer, or its salt. The binders may be employed singly or in combination. The amount of the first binder is preferably 0.5 to 10 pts·mass, more preferably 1 to 8 pts·mass, for 100 pts·mass of positive electrode active material.

(Negative Electrode)

The negative electrode includes a negative electrode active material, a second carbon black, and a second binder as essential components. The negative electrode active material includes a silicon-containing material and graphite. A negative electrode of a coin-shaped or button-shaped battery can be obtained by compression-molding a mixture containing the essential components (negative electrode mixture) into a pellet shape. Furthermore, a belt-like negative electrode used for a winding-type battery or the like can be obtained by mixing the negative electrode mixture and a liquid dispersion medium to prepare slurry, applying the slurry to a negative electrode current collector to form a coated film, and drying and compressing the coated film.

When a silicon-containing material is employed as the negative electrode active material, a high capacity battery is easily obtained Furthermore, this battery hardly has degraded even if the negative electrode potential increases at the full discharge state. Examples of the silicon-containing material are a silicon simple substance, a silicon alloy, a silicon compound (nitride, sulfide, or oxide) and so on. The silicon-containing materials may be employed singly or in combination. Among them, a silicon alloy is preferable because of a high conductivity. Therefore, the percentage of a silicon alloy in the silicon-containing material is preferably 70 mass % or more, more preferably 80 mass % or more. The silicon alloy may occupy 100% of the silicon-containing material.

As the silicon alloy, an alloy of silicon and transition metal element is preferable. The silicon alloy may include an electrochemically-active amorphous silicon phase (amorphous Si phase) and an electrochemically inert phase in a mixed state. The inert phase reduces the stress of the expansion and contraction of the amorphous Si phase by charge/discharge, and applies conductivity to the negative electrode active material. The inert phase normally includes an intermetallic compound of a transition metal element and silicon. The amorphous Si phase may include micro crystallites. The crystallite size is so small that it cannot be identified from an X-ray diffraction image, and is 10 nm or less, for example. The average particle diameter of the silicon alloy is for example 5 to 50 μm, preferably 10 to 40 μm.

Examples of the transition metal element included in the silicon alloy contains: elements (Ti, Zr, or the like) in group 4 on the periodic table; elements (Cr, Mo, W, or the like) in group 6; elements (Mn or the like) in group 7; elements (Fe or the like) in group 8; elements (Co or the like) in group 9; elements (Ni or the like) in group 10; and elements (Cu or the like) in group 11. The intermetallic compound may include only one transition metal element, or may include two or more transition metal elements. Among them, an Si—Ti alloy, an Si—Ni alloy, an Si—W alloy, and an Si—Co alloy are preferable, and an Si—Ti alloy is more preferable. The silicon alloy can be manufactured by a mechanical alloying method, a vacuum deposition method, a plating method, a gas-phase chemical reaction method, a liquid quenching method, or an ion-beam sputtering method. From the viewpoint of enhancing the effect of reducing the stress at charge/discharge and obtaining a high capacity and a high conductivity in the silicon alloy, the mass ratio between the silicon and transition metal element (silicon: transition metal element) is preferably 40:60 to 80:20, more preferably 50:50 to 75:25.

The negative electrode active material includes a silicon-containing material and graphite, and furthermore may include a component known as a negative electrode active material of the nonaqueous electrolyte battery. Here, the percentage of the silicon-containing material in the negative electrode active material is preferably 60 mass % or more, more preferably 70 mass % or more. As the known component, lithium titanate or a tin-containing material is employed.

When the negative electrode active material includes graphite, the expansion and contraction of the negative electrode is further suppressed. The graphite may be a carbonaceous material having a graphite structure, and specifically includes natural graphite, artificial graphite, or graphitized meso-phase carbon. It is desirable that a diffraction image obtained by measuring the graphite by a wide-angle X-ray diffraction method has a peak attributed to the (101) plane and a peak attributed to the (100) plane. At this time, the ratio of intensity I(101) of the peak attributed to the (101) plane to intensity I(100) of the peak attributed to the (100) plane preferably satisfies $0.01<I(101)/I(100)<0.25$, and more preferably satisfies $0.08<I(101)/I(100)<0.20$. The average particle diameter of the graphite is for example 5 to 40 μm, preferably 10 to 30 μm.

The average particle diameters of the silicon alloy and graphite are determined as median diameters in the volume-based particle size distribution, using a particle-size distribution measuring apparatus of a laser diffraction scattering type, for example.

The amount of the graphite included in the negative electrode is preferably 10 to 40 pts·mass, more preferably 15 to 30 pts·mass, for 100 pts·mass of silicon-containing material. Thus, the effect of suppressing the expansion and contraction of the negative electrode is enhanced.

The negative electrode active material may be previously doped with lithium. The lithium dope is promoted, by producing a negative electrode (or a negative electrode precursor), then pasting a lithium foil on the negative electrode, and immersing them in a nonaqueous electrolyte. From the viewpoint of suppressing the increase in internal resistance and the capacity reduction in the negative electrode, the lithium dope is preferably performed during assembling the battery.

The negative electrode includes a second carbon black as a second conductive agent. Thereby, when the battery voltage arrives at around 0V, the negative electrode allows to be easily stabilized. Therefore, excessive increase in negative electrode potential is suppressed. The stabilization of the negative electrode potential is also caused by interaction of the carbon black with the anions or cations in the nonaqueous electrolyte. The second carbon black is not particularly limited, but is appropriately selected from the carbon blacks that have been exemplified as the first carbon black included in the positive electrode. Among them, the same material as that of the first carbon black included in the positive electrode is preferably used for the second carbon black.

The amount of the second carbon black included in the negative electrode is preferably 2 to 10 pts·mass, more preferably 3 to 9 pts·mass, for 100 pts·mass of silicon-containing material. Thereby the negative electrode capacity can be kept high, and an effect of stabilizing the negative electrode potential by the carbon black is sufficiently exhibited.

The second conductive agent may include a material other than the second carbon black. As such a second conductive agent, carbon fiber or a non-graphitizable carbon (hard carbon) is employed.

The second binder included in the negative electrode is appropriately selected from the materials exemplified as the first binder included in the positive electrode. Among them, from the viewpoint of a high binding property, acrylic polymer or its salt is preferable. Example of the acrylic polymer include polyacrylic acid, polymethacrylic acid, acrylic acid-methacrylic acid copolymer, ethylene-acrylic acid copolymer, and acrylic acid-methyl acrylate copolymer. The second binders may be employed singly or in combination. The amount of the second binder is preferably 1 to 20 pts·mass, more preferably 5 to 15 pts·mass, for 100 pts·mass of negative electrode active material.

(Separator)

As a separator disposed between the positive electrode and the negative electrode, a woven fabric, a nonwoven fabric, or a microporous film can be employed, for example. As the resin constituting the woven fabric or nonwoven fabric, polyolefin, polyphenylene sulfide, aramid, polyimide, polyamide imide, or polyether ether ketone can be employed, for example. As the resin constituting of the microporous film, polyolefin, aramid, polyimide, or polyamide imide is preferable. In the case of a coin-type battery, the thickness of the separator is appropriately selected from a range of about 10 to 250 μm.

(Nonaqueous Electrolyte)

The nonaqueous electrolyte includes a nonaqueous solvent and a solute (especially, lithium salt). The solute is dissolved in the nonaqueous solvent. The concentration of the solute in the nonaqueous electrolyte is 0.5 to 2 mol/L, for example.

The nonaqueous solvent is not particularly limited. Examples of the nonaqueous solvent include: cyclic carbonate such as ethylene carbonate (EC), propylene carbonate (PC), or butylene carbonate; chain carbonate such as dimethyl carbonate, diethyl carbonate, or ethyl methyl carbonate; cyclic ether such as 1,4-dioxane, 1,3-dioxolan, tetrahydrofuran, 2-methyltetrahydrofuran, 3-methyltetrahydrofuran; chain ether such as 1,2-dimethoxyethane (DME), 1,2-diethoxyethane, 1,3-climethoxypropane, diethylene glycol dimethyl ether, or tetraglyme; lactone such as γ-butyrolactone (GBL); and sulfoxide compound such as sulfolane. The nonaqueous solvents may be employed singly or in combination. Among them, 1,2-dimethoxyethane (DME) is preferable because of a high conductivity and an excellent low-temperature characteristic. From the viewpoint of the characteristic balance, it is preferable that DME is used in combination with EC and/or PC. The percentage of DME in the nonaqueous solvent is preferably 30 to 70 mass %, more preferably 40 to 60 mass %.

The solute is not particularly limited either. Examples of the solute include a lithium salt of fluorine-containing sulfonylimide, a lithium salt of fluorine-containing acid, and a lithium salt of chlorin-containing acid (for example, $LiClO_4$). The solutes may be employed singly or in combination. As the lithium salt of fluorine-containing sulfonylimide, for example, lithium bis(trifluoromethanesulphonyl) imide (TFSI: $LiN(CF_3SO_2)_2$) is preferable. As the lithium salt of fluorine-containing acid, lithium tetrafluoroborate ($LiBF_4$) is preferable, for example. Among them, when TFSI is used, a nonaqueous electrolyte having a high conductivity in a wide temperature range can be obtained.

The nonaqueous electrolyte further can include a known additive agent. Examples of the additive agent include: carbonate having a polymerizable unsaturated bond, such as vinylene carbonate or vinyl ethylene carbonate; cyclohexylbenzene; and diphenyl ether.

FIG. 1 is a cross-sectional view of a coin-type lithium secondary battery in accordance with an exemplary embodiment of the present invention. Lithium secondary battery 10 includes: battery case 1 made of stainless steel; disk/pellet-shaped positive electrode 4 disposed on the inner bottom surface of case 1; disk/pellet-shaped negative electrode 5 disposed so as to face positive electrode 4; separator 6 interposed between positive electrode 4 and negative electrode 5; a nonaqueous electrolyte (not shown); and sealing plate 2 made of stainless steel for blocking an opening in battery case 1. Positive electrode 4 includes vanadium pentoxide, a first carbon black, a first binder, and aluminum powder. The porosity of the positive electrode is controlled from 35 to 46 vol %, for example. While, negative electrode 5 includes a silicon alloy, graphite, a second carbon black, and a second binder. Separator 6 is a nonwoven fabric or microporous film punched in a circular shape. An injection-molded resin-made gasket 3 is disposed at the opening end of battery case 1. The opening end of battery case 1 is caulked to a rim of sealing plate 2 via gasket 3. In assembling battery 10, a lithium foil is attached on negative electrode 5. By pouring a nonaqueous electrolyte, the nonaqueous electrolyte, negative electrode 5, and the lithium foil are electrochemically short-circuited, and then doping the negative electrode active material with lithium is promoted.

Hereinafter, the present invention is described specifically on the basis of examples and comparative examples. However, the present invention is not limited to the following examples.

Example 1

A coin-type lithium secondary battery (battery A1) shown in FIG. 1 is produced by the following procedure.

(1) Producing Positive Electrode

A positive electrode mixture is obtained by mixing 7 pts·mass of first carbon black, an aqueous dispersion including 5 pts·mass of fluorine resin as a first binder, and 5 pts·mass of aluminum powder into 100 pts·mass of crystalline vanadium pentoxide (average particle diameter obtained by air permeability method: 8 μm) as a positive electrode active material. Next, the positive electrode mixture is molded into a disk-shaped pellet of a diameter of 6.2 mm and a thickness of 1.09 mm, and is dried at 200° C. for 10 hours, thereby producing a positive electrode.

As the carbon black of the first conductive agent, Ketjen black of a particle diameter of 40 nm is employed.

As the fluorine resin of the first binder, tetrafluoroethylene-hexafluoropropylene copolymer (FEP) is employed.

As the aluminum powder, powder contained particles of a particle diameter of 45 μm or less by 80 mass % or more is employed.

(2) Producing negative electrode precursor

A Ti—Si alloy is prepared by a mechanical alloying method. At this time, metal titanium and a silicon simple substance are input into a vibrating ball mill device at a mass ratio of 35:65, and stainless-steel-made balls of a particle diameter of 15 mm are further input into it. The inside of the device is substituted by argon, and is kept at 1 atm. In this condition, a mechanical alloying operation is performed. The vibrating ball mill device is driven in the condition in which the amplitude is 8 mm and the rotation] speed is 1200 rpm, and mechanical alloying is performed for 80 hours. The obtained alloy powder is classified, and alloy powder (silicon-containing material) of a particle diameter of 50 μm or less is used as the negative electrode active material.

A negative electrode mixture is prepared by mixing 4 pts·mass of second carbon black, 20 pts·mass of graphite, and 10 pts·mass of polyacrylic acid as the second binder into 100 pts·mass of alloy powder. Next, the negative electrode mixture is molded into a disk-shaped pellet of a diameter of 7.0 mm and a thickness of 0.30 mm, and is dried at 160° C. for 12 hours, thereby producing a negative electrode precursor.

As the second carbon black, Ketjen black of a particle diameter of 40 nm is employed.

As the graphite, graphite of an average particle diameter of 10 μm (manufactured by Nippon Graphite Industries, Co., Ltd.) is employed.

As the polyacrylic acid as the second binder, non-cross-linked polyacrylic acid (manufactured by Toagosei Co., Ltd.) of a weight-average molecular weight of 1,000,000 is employed in an aqueous solution state.

(3) Producing Battery

Battery A1 is assembled using a positive electrode and a negative electrode. As the outer dimension of the battery, the outer diameter is 9.5 mm and the height is 2.0 mm. When a positive electrode and negative electrode having these sizes are used, the positive electrode capacity is sufficiently higher than the negative electrode capacity.

In assembling the battery, a lithium foil is attached on one surface of the negative electrode precursor, and is brought into contact with the nonaqueous electrolyte in the battery, thereby doping alloy powder in the negative electrode precursor with lithium. By the lithium dope, the negative electrode precursor is converted into a negative electrode. The mass of the lithium foil attached on the negative electrode precursor is made equal to the sum total of the amount equivalent to the irreversible capacity of the negative electrode and the amount equivalent to 100% of the reversible capacity thereof.

As the separator, a polypropylene-made nonwoven fabric is employed.

As the gasket, polypropylene is employed.

A nonaqueous electrolyte is prepared by dissolving lithium bis(trifluoromethanesulphonyl)imide (LiTFSI) at a concentration of 1 mol/L in a mixture solvent of PC:EC:DME=1:1:1 (volume ratio).

The amount of the nonaqueous electrolyte poured into the battery is 45 μL.

(4) Evaluation (a) Evaluation of Initial Internal Resistance

Battery A1 just after the assembling is heated at 45° C. for 72 hours for aging treatment. After the aging, the internal resistance (1 kHz) of battery A1 is measured, and average value (R1) of 10 batteries is calculated. At this time, by a sine-wave alternating-current method (1 kHz) using a resistance measuring device, the resistance between a positive electrode terminal (positive electrode case) and a negative electrode terminal (sealing plate) is measured.

(b) Initial Discharge Capacity

Battery A1 after the aging is charged at a constant voltage of 3.3 V for 30 hours via a resistance of 510Ω, and then is discharged until the battery voltage becomes 2.0 V. Then, initial discharge capacity (C1) is measured.

(c) Evaluation of internal resistance after storage in the full discharge state Battery A1 after the measurement of discharge capacity C1 is fully discharged until the battery voltage becomes 0 V. At this time, the measurement results of both the positive electrode potential and negative electrode potential versus the metal lithium are 3.0 V.

Then, battery A1 in the full discharge state is stored in a constant temperature room at 60° C. for 100 days. The internal resistance (1 kHz) of battery A1 after the storage is measured similarly to the above-mentioned manner, and average value (R2) of 10 batteries is calculated. The ratio of R2 to R1 is determined.

(d) Capacity Retention Rate after Storage in the Full Discharge State

Battery A1 after the storage at 60° C. for 100 days in the full discharge state is charged at a constant voltage of 3.3 V for 30 hours via a resistance of 510Ω, and then is discharged until the battery voltage becomes 2.0 V. Then, discharge capacity (C2) is measured. The ratio of C2 to C1 is determined.

Examples 2 to 7

Batteries A2 to A7 are produced similarly to example 1 except that the balance between the positive electrode capacity and negative electrode capacity is changed, and are evaluated similarly to example 1.

Comparative Examples 1 and 2

Batteries B1 and B2 are produced similarly to example 1 except that the balance between the positive electrode capacity and negative electrode capacity is changed, and are evaluated similarly to example 1.

Table 1 shows the positive electrode potential and negative electrode potential versus the metal lithium at full discharge and the evaluation results of above-mentioned (c) and (d).

TABLE 1

| Battery | Positive/negative electrode potential (V) at full discharge vs Li | R2/R1 | C2/C1 |
|---|---|---|---|
| A1 | 3.0 | 1.2 | 0.87 |
| A2 | 3.3 | 1.1 | 0.91 |
| A3 | 3.2 | 1.2 | 0.90 |
| A4 | 2.9 | 1.2 | 0.88 |
| A5 | 2.8 | 1.3 | 0.87 |
| A6 | 2.7 | 1.3 | 0.86 |
| A7 | 2.5 | 1.5 | 0.85 |
| B1 | 2.3 | 3.5 | 0.62 |
| B2 | 2.0 | 4.5 | 0.54 |

Comparative Example 3

Battery B3 is produced similarly to example 1 except that the second carbon black is not used in preparing the negative electrode mixture, and is evaluated similarly to example 1.

Comparative Example 4

Battery B4 is produced similarly to example 1 except that, in preparing the positive electrode mixture, the first carbon black is not used, but 7 pts·mass of graphite is used for 100 pts·mass of vanadium pentoxide. Battery B4 is evaluated similarly to example 1. Here, the graphite has an average particle diameter of 10 μm, and is manufactured by Nippon Graphite Industries, Co., Ltd.

Table 2 shows the evaluation results of comparative examples 3 and 4.

TABLE 2

| Battery | Positive/negative electrode potential (V) at full discharge vs Li | R2/R1 | C2/C1 |
|---|---|---|---|
| B3 | 3.0 | 4.0 | 0.60 |
| B4 | 3.0 | 3.1 | 0.67 |

Examples 8 to 15

Batteries A8 to A15 are produced similarly to example 1 except that the composition of the nonaqueous electrolyte is changed as shown in Table 3, and R2/R1 is evaluated similarly to example 1. Table 3 shows the results. The solute concentration is the same as that in example 1.

TABLE 3

| Battery | Solute | Nonaqueous solvent (volume ratio) | R2/R1 |
|---|---|---|---|
| A8 | LiTFSI | PC:DME(3:2) | 1.4 |
| A9 | LiTFSI | EC:DME(3:2) | 1.3 |
| A10 | LiTFSI | EC:GBL:DME(2:1:2) | 1.7 |
| A11 | LiTFSI | GBL:EC:DME(2:1:2) | 1.6 |
| A12 | LiTFSI | GBL:PC:DME(2:1:2) | 1.8 |
| A13 | LiTFSI | PC:EC:DME(2:1:2) | 1.3 |
| A14 | $LiBF_4$ | EC:GBL:DME(2:1:2) | 2.3 |
| A15 | $LiBF_4$ | PC:EC:DME(2:1:2) | 1.1 |

According to the results in Table 1, the following can be understood. In the case that the positive electrode potential and negative electrode potential versus metal lithium are within a range of 2.5 to 3.5 V at a battery voltage of 0 V, the increase in internal resistance caused by degradation of the electrodes is small, and the capacity retention rate after keeping the battery in the full discharge state is also practical. According to the result of the past investigation, R2/R1 is sufficiently practical when it is 3 or less.

According to the results in Table 2, the following can be understood. In the case that one of the positive electrode and negative electrode includes no carbon black, even when the positive electrode potential and negative electrode potential with respect to metal lithium at a battery voltage of 0 V are within a range of 2.5 to 3.5 V, keeping the battery in the full discharge state increases the internal resistance due to the degradation of the electrodes and reduces the capacity retention rate.

According to the results in Table 3, the increase in internal resistance is slightly large when the nonaqueous solvent includes GBL. Furthermore, it is estimated that a nonaqueous electrolyte including LiTFSI is more stable than a nonaqueous electrolyte including $LiBF_4$.

INDUSTRIAL APPLICABILITY

A nonaqueous electrolyte battery of the present invention has a high characteristic even after keeping in a full discharge state. Therefore, the nonaqueous electrolyte battery is appropriate for applications such as main power sources of various mobile devices and backup power sources.

The invention claimed is:

1. A nonaqueous electrolyte battery comprising:
a positive electrode;
a negative electrode;
a separator interposed between the positive electrode and the negative electrode; and
a nonaqueous electrolyte,
wherein the positive electrode includes vanadium pentoxide, a first carbon black, and a first binder,
wherein the negative electrode includes a silicon-containing material, graphite, a second carbon black, and a second binder, and
wherein, when a battery voltage is 0 V, a potential of each of the positive electrode and the negative electrode is 2.5 to 3.5 V versus metal lithium.

2. The nonaqueous electrolyte battery according to claim 1, wherein
an amount of the first carbon black included in the positive electrode is 2 to 10 parts by mass for 100 parts by mass of the vanadium pentoxide.

3. The nonaqueous electrolyte battery according to claim 1, wherein
an amount of the graphite included in the negative electrode is 10 to 40 parts by mass for 100 parts by mass of the silicon-containing material.

4. The nonaqueous electrolyte battery according to claim 1, wherein
an amount of the second carbon black included in the negative electrode is 2 to 10 parts by mass for 100 parts by mass of the silicon-containing material.

5. The nonaqueous electrolyte battery according to claim 1, wherein
the silicon-containing material includes a silicon alloy.

6. The nonaqueous electrolyte battery according to according to claim 1, wherein
the nonaqueous electrolyte includes a nonaqueous solvent, and a solute dissolved in the nonaqueous solvent, the nonaqueous solvent includes 1,2-diethoxyethane, and the solute includes at least one selected from a group consisting of lithium tetrafluoroborate and lithium bis(trifluoromethanesulphonyl)imide.

* * * * *